Jan. 31, 1933.  B. A. EVANS ET AL  1,895,922
BELT MAKING APPARATUS
Filed Jan. 8, 1930
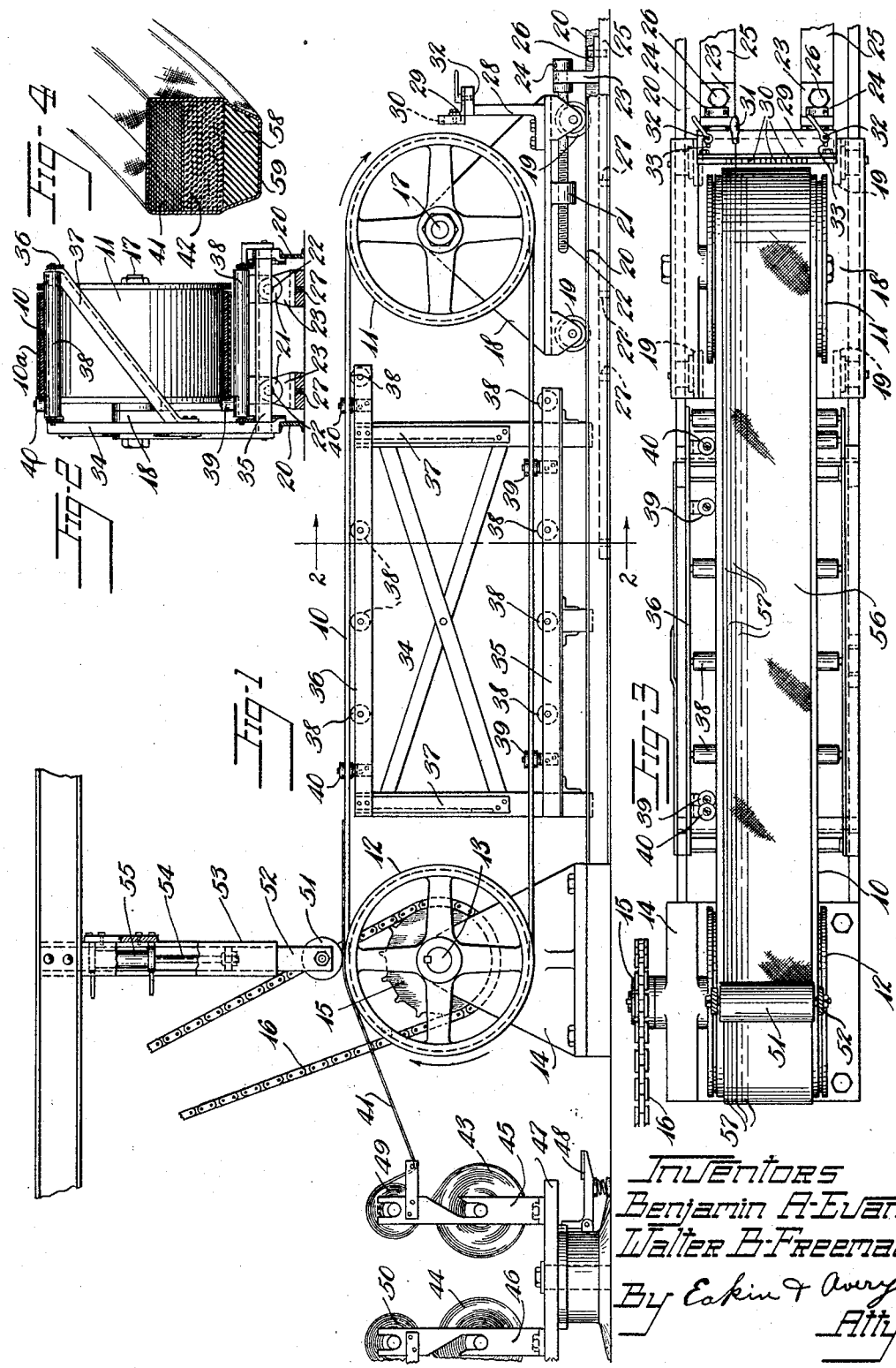
Inventors
Benjamin A. Evans
Walter B. Freeman
By Eakin & Avery
Attys Patented Jan. 31, 1933

1,895,922

UNITED STATES PATENT OFFICE

BENJAMIN A. EVANS AND WALTER B. FREEMAN, OF CUYAHOGA FALLS, OHIO, ASSIGNORS TO THE B. F. GOODRICH COMPANY, OF NEW YORK, N. Y., A CORPORATION OF NEW YORK

BELT-MAKING APPARATUS

Application filed January 8, 1930. Serial No. 419,363.

This invention relates to belt-making apparatus, and more especially to apparatus for the manufacture of endless transmission belts of relatively long length.

The chief objects of the invention are to provide improved apparatus for making endless belts of long length; to provide conveniently for the manufacture of belts of various lengths; and to provide accuracy in the dimensions of the completed belts.

Of the accompanying drawing:

Fig. 1 is a side elevation of our improved belt making apparatus, in its preferred form, at the initial stage of operation.

Fig. 2 is a section on line 2—2 of Fig. 1.

Fig. 3 is a plan view of the apparatus at the final stage of operation.

Fig. 4 is a sectional perspective view of a belt having a body portion such as is constructed upon my improved apparatus.

Referring to the drawing, 10 is an endless pattern belt mounted upon a pair of pulleys 11, 12, of which the latter only is driven, said pulleys preferably having end flanges as shown to hold the belt 10 in a true course.

Transmission belts are constructed by applying a plurality of plies of rubberized fabric to the outer face of the pattern belt 10 as the latter is driven, and thereafter longitudinally severing the relatively wide belt thus formed into a plurality of relatively narrow belts, and the outer face of the pattern belt preferably is provided with a cushion 10a of rubber or other suitable material to protect it from the cutter as the work is severed thereupon. The pulley 11 has a substantial range of movement toward and away from the pulley 12, to permit the use of pattern belts of different lengths in the manufacture of transmission belts of various sizes.

The pulley 12 is mounted upon an overhanging drive-shaft 13 which is journaled at one end in a stationary frame or bracket 14, and said shaft is provided with a sprocket 15 connected by a sprocket chain 16 with suitable driving means (not shown). The pulley 11 is journaled upon an overhanging shaft 17 which is mounted upon a wheeled carriage 18, the wheels 19 of which are flanged and ride upon a pair of rails 20, 20. Extending downwardly from the under side of the floor of the carriage 18 are transversely spaced ears 21, 21, and threaded through said ears are respective screws 22, 22 which are swiveled in individual brackets 23, 23 and provided respectively with apertured heads 24, 24 by which they are manually rotated with the aid of a suitable tool.

The brackets 23 are secured to respective plates or supports 25, 25 by bolts 26, 26, and said plates are secured to the floor between and parallel to the rails 20, and are provided at spaced intervals with threaded recesses 27, 27 to receive said bolts 26. Thus the position of the brackets 23 on the plates 25 may be altered to provide major adjustment of the pulley 11 with relation to the pulley 12, and the finer adjustments made thereafter with the screws 22. The provision of two adjustment screws makes it possible to align the shaft 17 accurately in parallelism with the shaft 13, and to compensate for any play between the wheels 19 and track 20, or any deflection of the overhanging shafts 13, 17 due to tension of the belt 10.

An angular bracket 28 is mounted upon the carriage 18 at the rear end thereof, and supports a cutting-gauge or knife-guide 29 which is provided with a series of accurately spaced slots 30, 30 for the reception of a knife 31. The knife-guide 29 is secured to the bracket 28 by bolts 32, 32 which extend through slots 33, 33 in the knife-guide. The respective bolts 32 are provided with handles or levers by which they are manually turned. The arrangement is such that the knife-guide may be easily and quickly positioned in operative position adjacent the pattern belt 10 and drum 11, or retracted therefrom to permit the easy removal of the work from said belt.

If the pattern belt employed is of short length, no intermediate support for its upper and lower reaches is necessary. If said belt is of long length we provide a supporting structure or frame 34 adapted to rest upon the rails 20, and provided with a lower platform 35 positioned below the lower reach of the belt 10 and an upper, overhanging platform 36 positioned below the upper reach of said belt, said upper platform being supported from one side only by angle brackets 37, 37. Said platforms 35, 36 comprise open frames in which are journaled horizontal rollers 38, 38 upon which the pattern belt may ride in passing between the pulleys 11, 12. Vertical guide rollers 39, 40 are mounted upon the respective platforms 35, 36 and engage a margin of the belt 10 to assist in holding the latter in a true course.

The work comprises a belt made up of a plurality of superposed convolutions of fabric treated with unvulcanized rubber, said convolutions extending lengthwise of the work. The belt may comprise more than one kind of fabric or arrangement thereof since the structure of the work forms no part of this invention. The work shown comprises two kinds or grades of body fabric 41, 42, Fig. 4, which fabric, wound with liner in rolls 43, 44, is mounted in respective brackets 45, 46 on a turret 47 positioned adjacent the work-receiving end of the belt-making apparatus. The turret 47 is provided with a foot-treadle 48 by which it is indexed to present, alternatively, the respective rolls 43, 44 in delivery relation to the belt-making apparatus. The brackets 45, 46 also support rotatable liner-rewinding rolls 49, 50 for rewinding the liners of the rolls 43, 44 as the fabric 41, 42 is withdrawn therefrom.

For compacting the respective plies of the work as it is applied to the pattern belt 10, we provide a presser roller 51 positioned parallel to the pulley 12 and above the same and the pattern belt thereon. The presser roll 51 is journaled in a yoke 52 which is slidably mounted for vertical movement in a guide structure 53, said yoke being secured to the outer end of the piston rod 54 of a fluid pressure cylinder 55.

In the operation of the apparatus, a pattern belt 10 of proper length being mounted upon the pulleys 11, 12 and drawn taut, the outer surfaces of said belt is treated with a coat of suitable adhesive to cause the work temporarily to adhere thereto. The leading end of the fabric strip 41 is then applied to the pattern belt, the presser roller 51 lowered thereupon, and the pattern belt set in motion in the direction of the arrows, Fig. 1, by means of the driving pulley 12. As soon as a sufficient number of plies of the fabric 41 are on the belt, its movement is arrested, the fabric strip 41 is severed, and the fabric strip 42 fed onto the belt in the same manner as the first strip, until the required number of plies are built up to provide the belt-structure 56 shown in Fig. 3.

After the movement of the belt 10 again is stopped and the fabric strip 42 severed from the roll of fabric 44, the alignment of the pulley 11 is checked, and corrected by means of the screws 22 if necessary, to assure accurately the parallelism of the pulleys 11, 12 so that the margins of the work 56 are of equal length. Then the belt 10 again is set in motion and the knife 31 is fed successively through the slots 30 in the knife-guide 29 to sever the belt-structure 56, longitudinally, into a plurality of relatively narrow belts 57, 57 of uniform width and length, the knife-guide 29 being so positioned with relation to the belt 10 that the knife 31 penetrates the belt structure 56 and enters the cushion 10a of the pattern belt 10 without penetrating said cushion to damage said pattern belt. The belts 57 are then removed from the pattern belt 10 and may be vulcanized and used as raw-edge driving belts if desired, or they may be provided on one side with a cushion of rubber 58, and with a fabric wrapper or cover 59, as shown in Fig. 4, and vulcanized to V-shape in a mold.

The apparatus is readily adaptable to the manufacture of belts of various lengths, and the belts produced possess uniformity and accuracy of length.

Our invention may be modified within the scope of the appended claims.

We claim:

1. Belt-making apparatus comprising a pattern belt adapted to receive belt-building material fed thereonto in the direction of its movement, selective material supply means in alignment therewith, means for driving said pattern belt, means for laterally guiding said pattern belt and means for compacting the successive plies of material fed thereonto as such plies are applied.

2. Belt-making apparatus comprising a pattern belt adapted to receive a strip of belt-building material fed thereonto in the direction of its movement, material supply means in alignment therewith, means for pressing the material as it is applied to the belt, means for driving said pattern belt, means for laterally guiding said pattern belt and a cutting device adapted to sever an endless band of material on said pattern belt into a plurality of endless belts.

3. Belt-making apparatus comprising a pattern belt adapted to receive a strip of belt-building material and to wind the same about its outer surface in a plurality of superposed convolutions, means for compacting the convolutions as they are applied a protective cushion on the outer surface of said pattern belt, means for driving the pattern belt, means for laterally guiding the pattern belt and a cutting device adapted to sever the band of material on said pattern belt into a plurality of endless belts.

4. Belt-making apparatus as defined in claim 3 including means for limiting the extent of the movement of the cutting member to a point within the protective cushion of the pattern belt.

5. Belt-making apparatus comprising a pattern belt adapted to receive a strip of belt-building material and to wind the same onto its outer surface in a plurality of superposed convolutions, a pair of pulleys supporting said pattern belt, one of said pulleys being adjustable with relation to the other pulley, means for driving said other pulley, and a presser roller cooperating with the drive-pulley and pattern belt for compacting the successive convolutions of material as they are drawn onto said pattern belt.

6. Belt-making apparatus as defined in claim 5 including a cutting device associated with the pattern belt and the adjustable pulley.

In witness whereof we have hereunto set our hands this 17th day of December, 1929.

BENJAMIN A. EVANS.
WALTER B. FREEMAN.